Sept. 10, 1974     L. M. NIEBYLSKI     3,834,881
FOAMED METAL ARTICLE
Filed Nov. 24, 1971
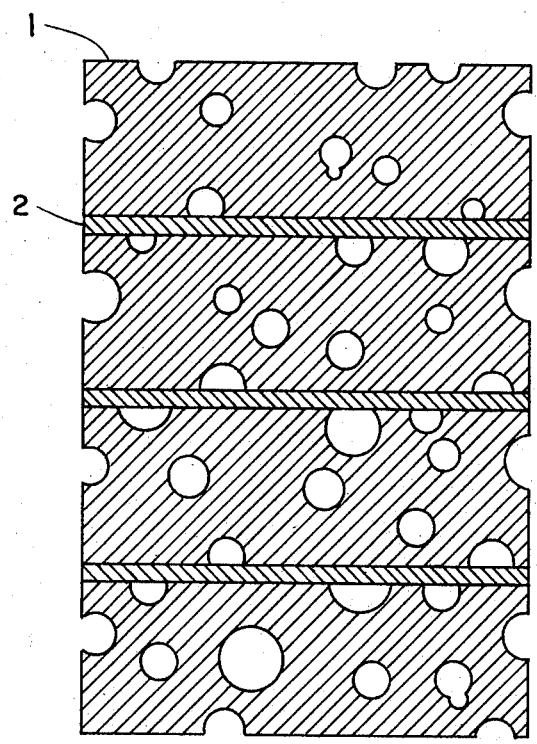

3,834,881
FOAMED METAL ARTICLE

Leonard M. Niebylski, Birmingham, Mich., assignor to Ethyl Corporation, Richmond, Va.
Filed Nov. 24, 1971, Ser. No. 201,909
Int. Cl. B32b 15/00
U.S. Cl. 29—197.5                               8 Claims

ABSTRACT OF THE DISCLOSURE

A laminated structure of foamed metal layers with a load distributing sheet material interposed between the foamed metal to prevent catastrophic shear.

BACKGROUND OF THE INVENTION

Production of foamed metals, particularly foamed aluminum, is known; see for example, U.S. 2,895,819; 3,300,296; and 3,297,431. The foamed metals produced by processes similar to those described in the foregoing patents and other processes are known to have shock absorbing properties. However, some foamed metals made from brittle or high strength alloys, particularly some aluminum alloys, and metal foams of high density compress only to about 10 to 20 percent and then fail drastically in shear. This is called catastrophic shear. This is especially undesirable in applications requiring shock absorbency, particularly for specific applications requiring compressibility from about 20 to about 65 percent of original height. Catastrophic shear is most undesirable in columnar structures. By a columnar structure is meant a structure having a height which is large in proportion to the width of the base and usually greater than twice the width of the base. A need exists for foamed metals, and particularly foamed aluminum, which can achieve up to about 65 percent compression without catastrophic shear and having increased shock absorbency.

An object of this invention is to provide foamed metals which exhibit improved shock absorbency. Another object of this invention is to provide foamed metal structures which compress up to about 65 percent under impact. A further object of this invention is to provide foamed metal, and particularly foamed aluminum, laminated structures which exhibit no catastrophic shear on compression of up to about 65 percent of their original height.

SUMMARY OF THE INVENTION

The foregoing objects and others which will be apparent from the following description are accomplished providing a laminated structure comprising a plurality of foamed metal layers having a sheet material interposed between said layers. A preferred laminated structure according to this invention is one in which the height of each of the foamed metal layers is at most about twice the width of the base of the foamed metal layer; the base being normal to the direction of applied force. While any foamed metal can be utilized in this invention, preferred foamed metals are foamed aluminum and its alloys. The sheet material can be metal, plastic, high strength paper, or any material which acts to distribute the applied force. Without limiting the invention, a preferred sheet material is metal and most preferably aluminum.

DESCRIPTION OF THE DRAWING

Referring to the drawing, FIG. 1 is a cross-sectional view of a laminated structure according to this invention.

PREFERRED EMBODIMENTS OF THE INVENTION

The foamed metal layer can be prepared from any metal capable of being foamed. Recent developments in foaming metals have shown that a wide variety of metals are capable of foaming. Typical of these are zinc, nickel, lead, iron, steel, and the like. Particularly preferred foamed metals can be prepared from aluminum and its alloys. Specifically, high strength and high density foamed aluminum of density greater than about 25 pounds per cubic foot (p.c.f.) have problems with catastrophic shear. In general, foamed aluminum having densities less than about 20 p.c.f. do not exhibit catastrophic shear on impact. Moreover, certain particularly ductile alloys also do not exhibit catastrophic shear. At densities greater than about 20 p.c.f. impact creates catastrophic shear rather than compression and deformation. The aluminum alloys useful in this invention may be any wrought or casting alloy, but preferably those which are relatively brittle. Certain high strength alloys are also useful. Without limiting the invention, any aluminum alloy which exhibits catastrophic shear on compression to greater than about 20 percent of its original height in a columnar structure as hereinafter defined may be used in the laminated structures of this invention. Typical are the following alloys, using the Aluminum Association alloy number designations.

AA alloy:
  7075 (1.6% Cu, 2.5% Mg, 0.3% Cr, 5.6% Zn, remainder Al)
  2024 (4.5% Cu, 0.6% Mn, 1.5% Mg, remainder Al)
  5086 (0.45% Mn, 4.0% Mg, 0.1% Cr, remainder Al)
  6063 (0.4% Si, 0.7% Mg, remainder Al)
  535 (6.2–7.5% Mg, remainder Al)
  520 (9.5–10.6% Mg, remainder Al)
  7001 (0.40% Fe, 1.6–2.6% Cu, 2.6–3.4% Mg, 6.8–8.0% Zn, remainder Al)
  2011 (5.5% Cu, 0.5% Pb, 0.5% Bi, remainder Al)
  2218 (4.0% Cu, 1.5% Mg, 2% Ni, remainder Al)
  3005 (1.2% Mn, 0.4% Mg, remainder Al)
  4042 (12.2% Si, 0.9% Cu, 1.1% Mg, 0.9% Ni, remainder Al)
  4043 (5% Si, 95% Al)
  8280 (1.5% Si, 1.0% Cu, 0.5% Ni, remainder Al).

By the use of the laminated structure of this invention, foamed aluminum produced from the above alloys does not shear catastrophically but compresses through as much as 65 percent of the original structure height. The method of producing the foamed metal is not critical to this invention. Thus, any foamed metal can be used without regard to the process for its production. Several processes of producing foamed aluminum are given in U.S. 2,895,819; 3,300,296; and 3,297,431 which references are hereby incorporated by reference as if fully set forth as illustrative of processes for making foamed metals, particularly foamed aluminum.

The foamed metal layer should not be thicker than required for forming a columnar structure. That is to say, the height of each foamed metal layer is at most about twice the width of the base of the foamed metal layer; the base being normal to the direction of impact or applied force. The thickness of the layers can practically be less than about 2 inches and most preferably from about ¾ of an inch to about 1 inch thick. As many layers as required can be used.

The sheet material can be any material which acts to distribute the applied force uniformly over the foamed metal layer. Without limiting the invention, the sheet material can be metal, plastic, high strength paper, rubber, wood, and the like. Thin metal sheets are preferred because of their relatively high strength in thin sheets. Preferred metals are aluminum and steel. A most preferred sheet material is aluminum. The sheet material is relatively thin compared with the foamed metal layer. It should be thick enough to add strength and distribute the applied force but not so thick as to add undue weight to the laminated structure. Generally, sheet materials ranging from about 2 to about 10 mils in thickness are preferred.

The laminated structure of this invention is prepared by placing a layer of sheet material on a foamed metal layer tnd then adding another foamed metal layer and another sheet material layer, and so on until the desired height is reached with the uppermost layer being a foamed metal layer. The layers do not have to be bonded together but the structure should be unitized to prevent unnecessary slippage between the layers. Thus, the laminated structure of this invention is preferably mechanically or adhesively bonded to maintain the structure as a single unit. In practice an adhesive bond is preferred because of its inherent low cost and the easy fabrication of the laminated structure. A continuous film of adhesive may be applied to either the sheet material or the foamed metal as the layers are successively placed in position. It is not necessary to have a continuous adhesive layer and strip or spot gluing is in many instances sufficient. The type of adhesive is not critical except that it maintain a good bond between the foamed metal layer and the sheet material. Suitable adhesives are epoxy resins, phenolic resins, polyamide resins, phenol-formaldehyde resins, polyester resins, polyurethane resins, acrylonitrile resins, and polyvinyl resins. Such adhesives are described in U.S. Pats. 2,437,981; 2,988,536; 2,727,869; 2,878,197; 2,478,943; 2,385,373; 2,385,374; 2,615,007; 2,615,008; 2,500,600; 2,582,985; 2,356,005; 2,597,025; 2,650,212; 2,116,635; 2,496,480; 2,036,092; 2,962,471; 2,859,200; 2,916,469; 2,794,788; 2,763,585; 2,776,232; and 2,450,940 which are incorporated herein by reference as if fully set forth. The laminated structure may also be mechanically bonded; for example, by welding, brazing, or heat treatment. The laminated structure may also be placed in a suitable container. Thus, a laminated structure of this invention can be placed in a cylindrical or rectangular sleeve having one end closure and a movable piston may be used to direct the compressive force.

Referring to FIG. 1, a laminated structure of this invention is shown having four foamed metal layers 1 with three sheet material layers 2 interposed between the foamed metal. FIG. 1 is a cross-sectional view of a laminated structure according to this invention. The foamed metal layer 1 and the sheet material 2 can be any of the materials described hereinabove. For the purposes of illustration the sheet material is shown to be metal. Although only four foamed metal layers are shown, it should be clear that any number of foamed metal layers separated by the sheet material may be used as contemplated in this invention.

The laminated structure of this invention can be prepared by slicing a slab of foamed metal into layers of the desired thickness and in accordance with the height and base relationship indicated hereinabove. The sheet material is then placed on the foamed metal and bonded to it to provide a laminated structure. Successive layers of foamed metal and sheet material are then added to the desired height with the last layer being foamed metal. The following example illustrates the preparation of the laminated structure of this invention.

EXAMPLE 1

A slab of foamed aluminum of 30–35 p.c.f. density, prepared from aluminum alloy 535, was sliced into layers 1 inch thick. From these 1-inch thick layers were cut squares 6 inches on each side. Using 5-mil sheet aluminum of alloy 1100, an alloy with a minimum of 99.00% Al, 6-inch squares were cut. The laminated structure was prepared by gluing the sheet material to the foamed aluminum to prepare a sample 12 inches high using Fuller Fe 073–9, a 2-part epoxy resin, produced by the H. E. Fuller Company, as the adhesive.

The compression of the foamed metal laminated structure prepared above was tested on an Instron Tester according to the following procedure. The laminated structure was placed under the crosshead of the Instron Tester and the crosshead was set at a rate of 1.0 inches per minute. The Instron Tester was turned on and the pressure required to compress the laminated structure was recorded until compression of about 70 percent was reached. To illustrate the uniform compression of the laminated structure of this invention, a foamed aluminum block measuring 6 x 6 x 12 inches of aluminum alloy 535 and having density of 25–30 p.c.f. was also tested according to the above procedure. After about 20 percent compression of the foamed aluminum block, catastrophic shear occurred. However, with the laminated structure of this invention, the 12-inch laminated block was compressed to about 4 inches high without catastrophic shear. Therefore, the usefulness of laminated structures of this invention is clearly apparent.

Laminated structures of this invention will find utility in any application requiring relatively light weight and high specific energy dissipation; for example in automobile bumpers, highway guard rails, utility pole guards, transport terminals, marine docking facilities, and the like. Although FIG. 1 shows the laminated structure to have no end or side coverings, it should be clear that any suitable coating material may be used to cover the laminated structure's surface, providing a weather-resistant, dent-resistant, or aesthetically pleasing surface.

The foregoing description is illustrative only, and the invention is to be limited only by the lawful scope of the following claims.

What is claimed is:

1. A laminated columnar structure, capable of compression upon impact through at least 65 percent of the original structure height without catastrophic shear, comprising a plurality of foamed metal layers having a sheet material interposed between said layers in which the height of each of said foamed metal layers is at most about twice the width of the base, said base being normal to the direction of impact force, said sheet material acting to distribute the force applied to the structure substantially uniformly over said layers and said foamed metal being aluminum or an alloy thereof.

2. A laminated columnar structure of Claim 1 wherein said sheet material is aluminum.

3. A laminated columnar structure of Claim 1 wherein said foamed metal has a density of from about 30 to 35 p.c.f. and said sheet material is aluminum having a thickness of from about 2 to about 10 mils.

4. A laminated columnar structure of Claim 1 wherein said sheet material is adhesively bonded to said foamed metal.

5. A laminated columnar structure of Claim 1 wherein said foamed metal layer has a density of from about 30 to 35 p.c.f., said sheet material is aluminum having a thickness of from about 2 to about 10 mils and said sheet material is adhesively bonded to said foamed metal.

6. A laminated columnar structure of Claim 1 wherein each of said foamed metal layers is from about ¾ inch to about 2 inches in thickness.

7. A laminated columnar structure of Claim 1 wherein said foamed metal is prepared from Aluminum Association Alloy 535.

8. A laminated columnar structure of Claim 1 wherein said foamed metal is prepared from an aluminum alloy having from about 6.2 to about 7.5 percent magnesium and the remainder aluminum, said foamed metal has a density of from about 30 to about 35 p.c.f., each of said foamed metal layers are about 1 inch in thickness, said sheet material is an aluminum alloy having not less than 99.00 percent aluminum and being about 5 mils in thickness and said sheet material is adhesively bonded to said foamed metal layers.

References Cited

UNITED STATES PATENTS

| | | | |
|---|---|---|---|
| 2,519,683 | 8/1950 | Marien | 29—191.2 |
| 3,401,025 | 9/1968 | Whitney | 29—191.2 |
| 1,633,258 | 6/1927 | Laise | 75—20 F |
| 2,935,396 | 5/1960 | Pashak | 75—20 F |
| 2,312,039 | 2/1943 | Hoglund | 29—197.5 |
| 2,747,261 | 5/1956 | Stosuy | 29—191.2 |
| 3,502,449 | 3/1970 | Phillips | 29—197 |
| 3,550,265 | 12/1970 | Rairden | 29—197 |
| 3,711,363 | 1/1973 | Jarema | 29—197.5 |

HYLAND BIZOT, Primary Examiner

U.S. Cl. X.R.

29—191, 194, 195 P